July 23, 1968    C. A. HACHEMEISTER    3,393,754
TORQUE SENSING CONTROL DEVICE

Filed Sept. 12, 1967    2 Sheets-Sheet 1

INVENTOR
CHARLES A. HACHEMEISTER
BY Leo C. Kraginski
ATTORNEY

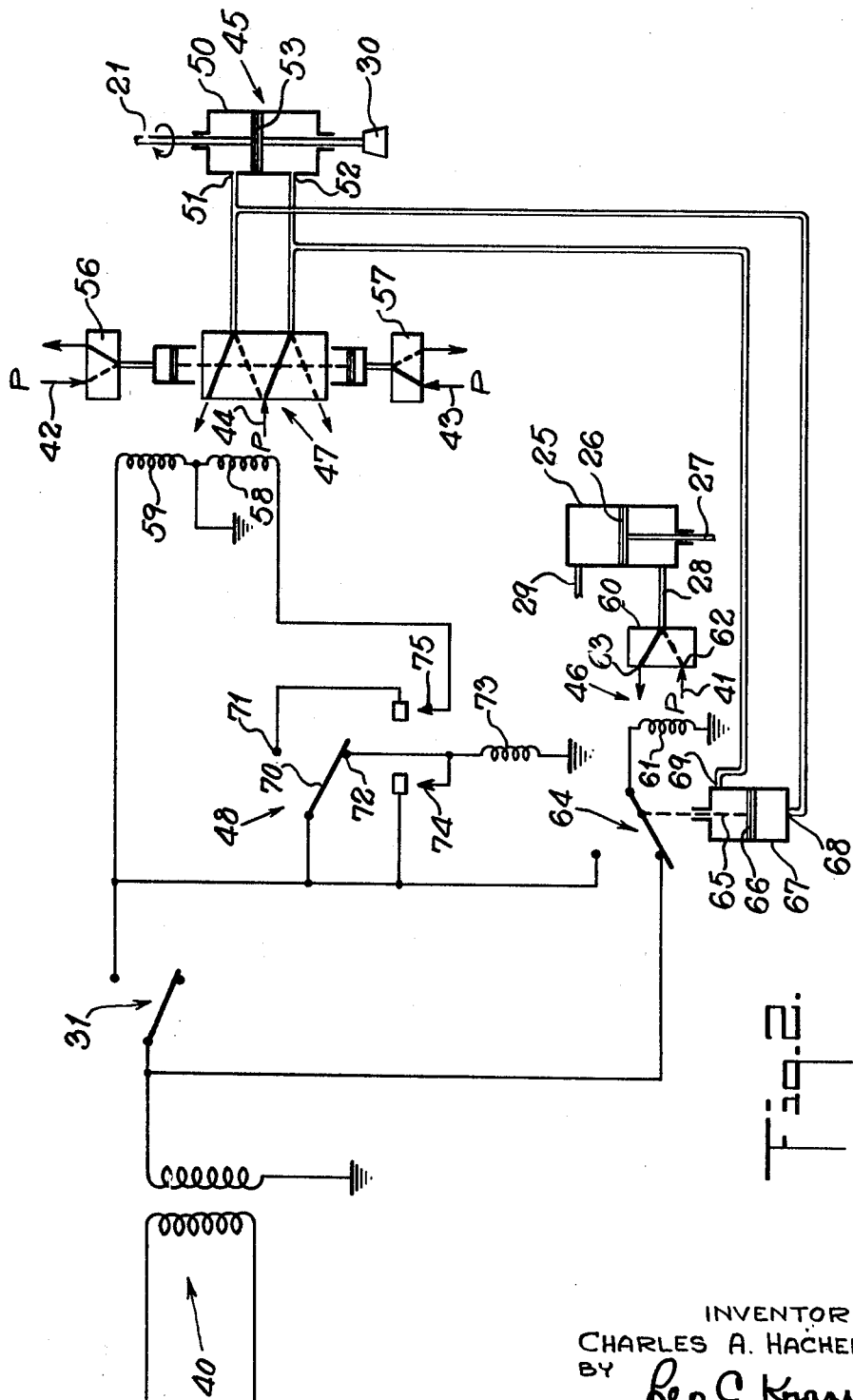

United States Patent Office 3,393,754
Patented July 23, 1968

3,393,754
TORQUE SENSING CONTROL DEVICE
Charles A. Hachemeister, 497 E. 43rd St.,
Brooklyn, N.Y. 11203
Filed Sept. 12, 1967, Ser. No. 667,258
7 Claims. (Cl. 173—5)

ABSTRACT OF THE DISCLOSURE

A torque sensing control device having a power operated drive shaft and a driven shaft for applying a torque connected by a belt and pulley system including a slidable bar which is moved due to unequal tensions in portions of the belt when the delivered torque has reached a predetermined value and operates a switch for uncoupling whatever is engaged by the driven shaft.

Background of the invention

The present invention relates to a torque sensing control device which is particularly adapted for use in a machine for screwing a cap onto a container by a chuck. When the predetermined torque is reached, the cap is stationary and the drive motor must be uncoupled from the shaft which drives the chuck.

Heretofore, such uncoupling has been accomplished by a friction clutch or other type of slipping clutch. Such clutches are unreliable and cause caps to be tightened on containers in a non-uniform manner.

Such uncoupling has also been accomplished by lock-release type clutches but such clutches are expensive and bulky and have intolerable moments of inertia for use in applying caps onto containers.

It has also been proposed to stop the motor and the chuck the instant the caps are properly tightened but this requires a complicated torque sensing and braking system.

Summary of the invention

Accordingly, an object of the present invention is to provide a torque sensing control device which is not subject to the foregoing difficulties and disadvantages.

Another object is to provide such a device which is simple, reliable and inexpensive.

A further object is to provide such a device which utilizes braking torque of the capping clutch shaft to actuate mechanism which uncouples the chuck and the cap.

Other and further objects will be obvious upon an understanding of the illustrative embodiment about to be described, or will be indicated in the appended claims and various advantages not referred to herein will occur to one skilled in the art upon employment of the invention in practice.

In accordance with the present invention, the foregoing objects are generally accomplished by providing a torque sensing control device which comprises a slidably mounted bar; an idler pulley mounted at each end of the bar; a pair of idler pulleys at each side of the bar; a power operated drive shaft having a pulley thereon located between a pair of pulleys at one side of the bar; a driven shaft, the rotation of which is resisted by the application of torque, having a pulley thereon located between a pair of pulleys at the other side of the bar; an endless belt passing over all of the pulleys, so that the drive pulley drives the driven pulley; and means for maintaining the bar in a position when the tension in the belt is substantially uniform throughout, the driven pulley upon the application of a predetermined torque thereon causing unequal tensions to exit in portions of the belt, so that the belt causes the bar to move in a direcion to overcome the last mentioned means.

Brief description of the drawings

A preferred embodiment of the invention has been chosen for purposes of illustration and description and is shown in the accompanying drawing, forming a part of the specification, wherein:

FIG. 2 is a diagram of the control circuit of the device.

Description of preferred embodiment

Figure 1:
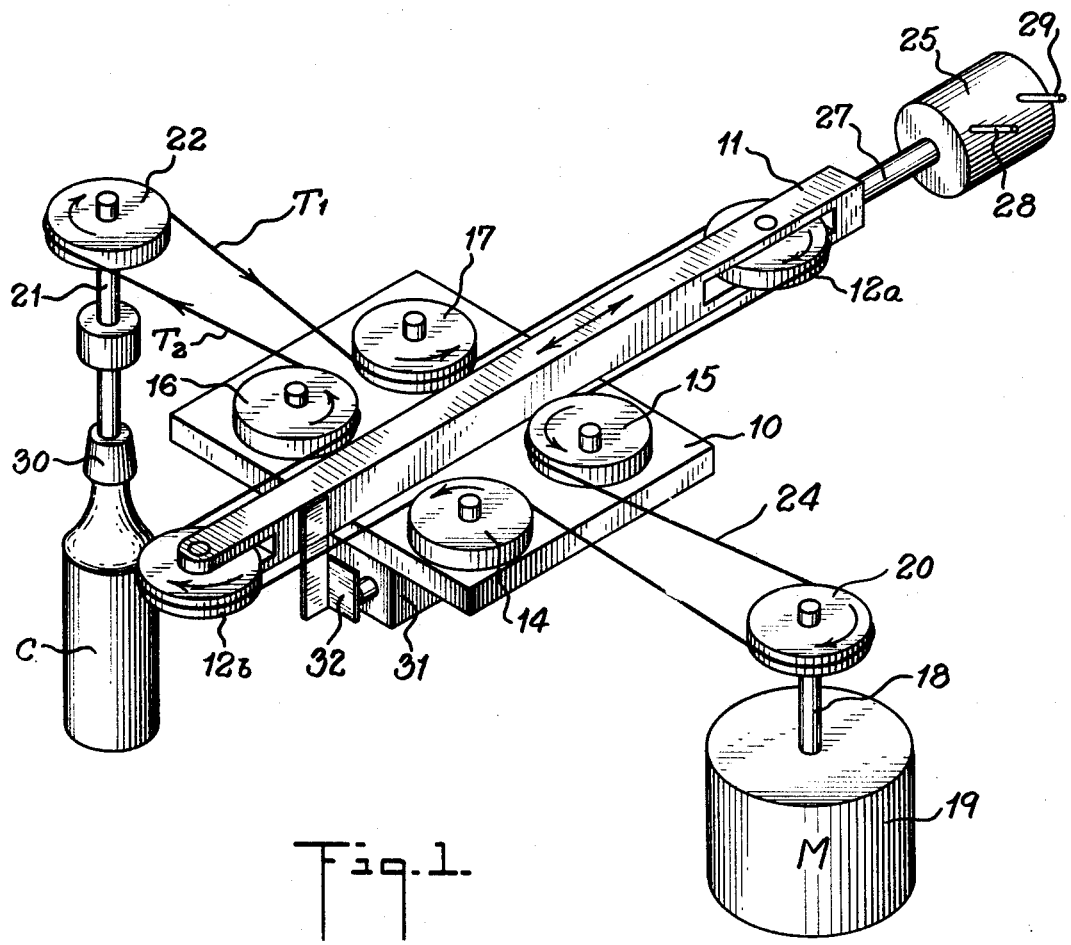
FIG. 1 is a schematic perspective view of a device in accordance with the present invention used in conjunction with a cap applying mechanism.

Referring now to FIG. 1 of the drawings in detail, a torque sensing control device is shown which comprises a base 10, a bar 11 slidably mounted on the base, an idler pulley 12a, 12b mounted at each end of the bar, a pair of idler pulleys 14 and 15 mounted on the base adjacent one side of the bar, a pair of idler pulleys 16 and 17 mounted on the base adjacent the other side of the bar, a shaft 18 driven by a motor 19 and having a drive pulley 20 thereon located adjacent the pulleys 14 and 15, a shaft 21 having a driven pulley 22 thereon located adjacent the pulleys 16 and 17, and an endless belt 24 passing at least partially around the pulleys 12a, 12b, 14, 15, 16, 17, 20 and 22 so that the drive pulley 20 drives the driven pulley 22. The directions in which the pulleys rotate are indicated by arrows.

The bar 11 is held in position when rotation of the driven pulley 22 and its shaft 21 are not resisted and the tension in the belt 24 is substantially uniform throughout. This can be accomplished by a cylinder 25, a piston 26 in the cylinder (FIG. 2), a piston rod 27 secured to one end of the bar 11, and a source of air under regulated pressure connected to a port 28 of the cylinder 25 to urge the piston 26 towards the right, as viewed in FIG. 1. The cylinder has a venting port 29 which allows the piston to move freely in the cylinder.

The driven shaft 21 has a chuck 30 thereon for engaging an object, such as a cap, and screwing it onto a container C. The shaft 21 is arranged for axial movement (FIG. 2) to enable the chuck to be moved into and out of engagement with the cap. The disengaging movement is in part controlled by a switch 31 on the base 10 which switch is actuated by an arm 32 depending from the bar 11.

When the barr 11 is positioned as shown, the driven shaft 21 and its pulley 22 are rotated at the speed determined by the drive shaft 18 and its pulley 20. As a counter-torque is developed by the cap being tightened on the container C, the tensions in the belt portions $T_1$ and $T_2$ at the driven pulley 22 become different. The torque delivered to the driven shaft 21 is $(T_1-T_2)R$ where R is the pitch radius of the driven pulley 22. The net pull tending to move the pulley 12a towards the left, as viewed in FIG. 1, is then $2T_1$ and the net pull tending to move the pulley 12b towards the right, as viewed in FIG. 1, is then $2T_2$. This results in a net force towards the left on the bar 11 of $2(T_1-T_2)$ which is proportional to the torque being developed by the driven shaft 21. A counter force towards the right is developed by the air cylinder 25 which restrains the bar from moving until the torque developed force overcomes the regulated air pressure developed force. This occurs when the cap has been tightened a predetermined amount and sufficient counter-torque is attained causing the driven shaft 21 to stop momentarily while the drive shaft 18 continues to rotate. Bar 11 moves and operates the switch 31 which in turn controls mechanism (not shown) for causing the chuck 30 to disengage the cap.

While pulleys and a belt have been shown as described herein, it will be apparent that sprockets could be substituted for the pulleys and that a chain could be substituted for the belt.

In FIG. 2, an electric-pneumatic control circuit which includes a source of electrical power 40, sources of regulated and unregulated air pressures available at 41, 42, 43 and 44, the air cylinder 25, the switch 31, an arrangement 45 for causing the chuck 30 to engage and disengage the cap, valving 46 and 47 for controlling the air cylinder 25 and the arrangement 45, respectively, and a switching arrangement 48 for preventing automatic recycling.

The arrangement 45 includes a cylinder 50 having ports 51 and 52, and a piston 53 in the cylinder which rotatably supports the driven shaft 21 and moves it axially to effect engagement and disengagement of the chuck 30 with the cap. When pressure regulated air is admitted to the port 51 from the source 44, air is released by way of the port 52 and vice versa. This is accomplished by a four-way valve 47 having pilot valves 56 and 57 provided with venting ports and ports respectively connected to the air sources 42 and 43 and controlled by solenoids 58 and 59, respectively.

The valving 46 for the air cylinder 25 includes a valve 60 controlled by a solenoid 61 and having a port 62 connected to the regulated air source 41 and a venting port 63. A switch 64 controls the solenoid 61 and switch 64 is actuated by a piston rod 65 connected to a piston 66 in a cylinder 67 having ports 68 and 69, respectively, in fluid flow communication with the ports 51 and 52.

The arrangement 48 for preventing automatic re-cycling includes a switch 70 having contacts 71 and 72, and a relay 73 controlled by the switch 70 having contacts 74 and 75.

In operation, the switch 31 is held closed by the arm 32 on the bar 11, the switch 64 is positioned to energize the solenoid 61 directly from the source 40, and the solenoid 61 maintains the valve 60 in a position to admit air under regulated pressure into the cylinder 25 from the source 41, the switch 70 engages its contact 72 and the relay 73 is energized, and the chuck 30 is in its upper position. The contact 74 locks in the relay while the contact 75 conditions the circuit for operation.

Cap tightening action is initiated by causing the switch 70 to engage its contact 71 while the relay 73 remains energized and its contacts 74 and 75 are closed.

The switch 70 now is operated to engage its contact 71 whereupon both solenoid coils 58 and 59 are energized to effect downward movement of the chuck 30 and tightening of the cap. As this occurs, the switch 64 is shifted to energize the solenoid 61 through the switch 31. When the cap is screwed on, the torsion sensing device responds to open the switch 31, and the relay 73 drops out and both solenoid coils 58 and 59 are de-energized. This causes air to enter the port 52 to raise the chuck 30, and disengage the cap and, after momentarily de-energizing the solenoid 61 to vent the air cylinder 25 to allow unrestricted movement of the bar 11, causes air to enter the port 69 of the cylinder 67. Whereupon the switch 64 again energizes the solenoid 61 directly through the source 40 and the bar 11 is returned to close the switch 31.

It will be observed that automatic re-cycling is prevented because the relay 73 dropped out when the switch 31 was opened and that the relay cannot be caused to close its contacts 74 and 75 until the switch 70 is again operated to engage its contact 72.

From the foregoing description, it will be seen that the present invention provides a torque sensing control device which eliminates the difficulties of slip-clutches and positive lock-release clutches and wherein the torque applying element engages an object under the influence of regulated air pressure.

As various changes may be made in the form, construction and arrangement of the parts herein, without departing from the spirit an scope of the invention and without sacrificing any of its advantages, it is to be understood that all matters are to be interested as illustrative and not in any limiting sense.

What is claimed is:

1. A torque sensing control device comprising a slidably mounted bar; an idler pulley mounted at each end of said bar; a pair of idler pulleys at each side of said bar; a power operated drive shaft having a pulley thereon located adjacent a pair of pulleys at one side said bar; a driven shaft, the rotation of which is resisted by the application of torque having a pulley thereon located adjacent a pair of pulleys at the other side of said bar; an endless belt passing over all of said pulleys so that said drive pulley drives said driven pulley; a cylinder; a piston in said cylinder; a piston rod secured to one end of said bar; and a source of air under regulated pressure connected to said cylinder to maintain said piston, said piston rod and said bar in a position when the tension in said belt is substantially uniform throughout, said driven pulley upon the application of a predetermined torque causing unequal tensions to exist in portions of said belt so that said belt causes said bar to move in a direction to overcome the regulated air pressure acting on said piston.

2. A device according to claim 1, including means on said driven shaft for gripping an object to be rotated, means for moving said gripping means into and out of engagement with the object, and switch means controlled by said bar for effecting operation of said moving means to cause said gripping means to disengage said object.

3. A device according to claim 2, including means operable upon said operation of said moving means for effecting release of air in said cylinder to enable said bar to be positioned by the unequal tensions in said belt.

4. A device according to claim 1, including means on said driven shaft for gripping an object to be rotated; a cylinder having a port at each end thereof for the admission and release of air under pressure, a piston in said last mentioned cylinder connected to said driven shaft for moving said gripping means into and out of engagement with the object, solenoid operated valve means for controlling the flow of air through said ports, a valve for controlling the admission and release of air into and out of said first mentioned cylinder, switch means for controlling said valve, a cylinder having ports at each end thereof for the admission and release of air under pressure, a piston in said cylinder having a piston rod connected thereto for operating said switch means, conduits connecting said ports of said last two mentioned cylinders so that air is released from said first mentioned cylinder when said gripping means move out of engagement with the object and air is admitted to said first mentioned cylinder when said gripping means move into engagement with the object, and switch means controlled by said bar for effecting actuation of said valve means to cause said gripping means to move out of engagement with the object.

5. A device according to claim 4, including switch means for effecting actuation of said valve means to cause said gripping means to engage the object, and means operable by said bar controlled switch means for rendering said last mentioned switch means ineffective.

6. A torque sensing control device comprising a slidably mounted bar; an idler pulley mounted at each end of said bar; a pair of idler pulleys at each side of said bar; a power operated drive shaft having a pulley thereon located adjacent said pair of pulleys at one side of said bar; a driven shaft, the rotation of which is resisted by the application of torque, having a pulley thereon located adjacent said pair of pulleys at the other side of said bar; an endless belt passing over all of said pulleys so that said drive pulley drives said driven pulley; and means for maintaining said bar in a position when the tension in said belt is substantially uniform throughout, said driven pulley upon the application of a desired torque thereon causing unequal tensions to exist in portions of said belt so that said belt causes said bar to move in a direction to overcome said last mentioned means.

7. A device according to claim 6, including switching means controlled by the movement of said bar.

References Cited

UNITED STATES PATENTS

| 1,949,119 | 2/1934 | Gibbs. | |
| 2,760,391 | 8/1956 | Knutson | 53—317 XR |
| 2,909,879 | 10/1959 | Hohl et al. | 53—331.5 |
| 3,018,597 | 1/1962 | Hohl | 53—331.5 XR |

FOREIGN PATENTS 998,168  7/1965  Great Britain.

FRED C. MATTERN, Jr., *Primary Examiner.*

J. A. WONG, *Assistant Examiner.*